United States Patent [19]

Capps

[11] Patent Number: 4,691,444
[45] Date of Patent: Sep. 8, 1987

[54] SURVEYOR'S LEVEL WITH CONSTANT INSTRUMENT HEIGHT AND METHOD

[76] Inventor: Grover Capps, Rte. 2, Box 388, Travelers Rest, S.C. 29690

[21] Appl. No.: 846,637

[22] Filed: Apr. 1, 1986

[51] Int. Cl.⁴ ............................................. G01C 5/00
[52] U.S. Cl. ........................................ 33/290; 33/292
[58] Field of Search ................ 33/290, 291, 292, 248, 33/298

[56] References Cited

U.S. PATENT DOCUMENTS

| 18,689 | 11/1857 | Gray | 33/290 |
| 2,571,287 | 10/1951 | Peters | 33/291 |
| 3,588,249 | 6/1971 | Studebaker | 33/290 |

FOREIGN PATENT DOCUMENTS

| 79191 | 9/1962 | France | 33/290 |

Primary Examiner—Willis Little
Attorney, Agent, or Firm—Cort Flint

[57] ABSTRACT

A surveyor's instrument such as a surveyor's level (10) and method is disclosed wherein a constant instrument height may be provided during repeated set ups of a tripod (22) at different locations at a job site. An adjustable elevating device (24) is provided which mounts a surveyor's level (10) in a manner that its vertical position is changed. The elevating device includes an adaptor base cap (30) which adapts to a tripod collar (20) having a hollow sleeve (32). A shaft (28) which carries an adapter collar (26) is slideably received in the sleeve (32) and set in a desired vertical position by set screw (38) or a gear drive (50, 46, 40). The surveyor's level (10) is affixed to an adapter collar (26) by a level base cap (18).

18 Claims, 11 Drawing Figures

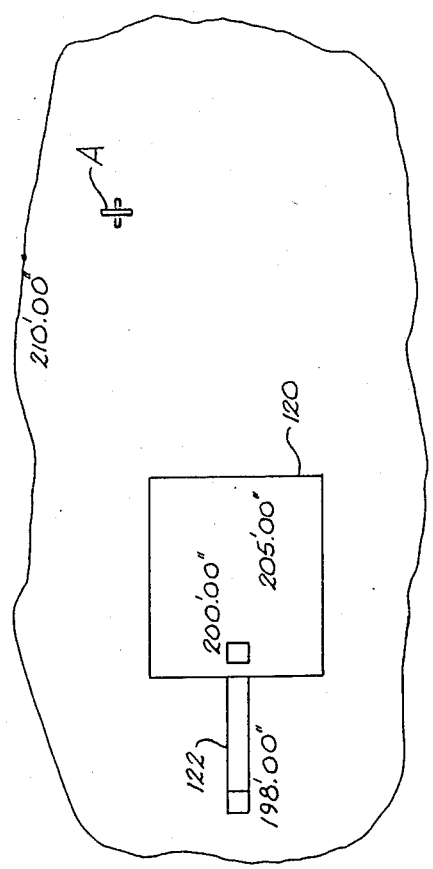
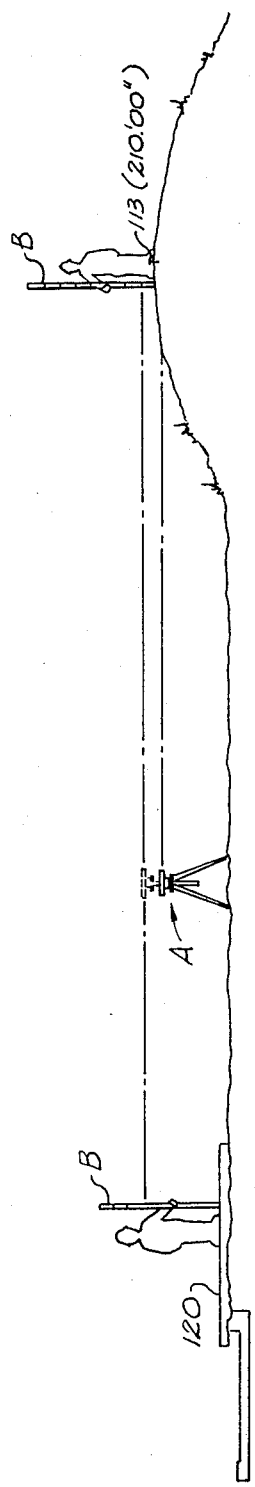
Fig. 10a
Fig. 10

4,691,444

SURVEYOR'S LEVEL WITH CONSTANT INSTRUMENT HEIGHT AND METHOD

BACKGROUND OF THE INVENTION

The invention relates to the field of surveying and to a surveyor's level or transit for use in surveying and method by which surveying calculations may be based on a constant instrument height in reference to a prescribed benchmark despite moving of the tripod to different locations and elevations at a job site.

Prior survey levels and transits have been utilized which mount on the top of a tripod. The conventional surveyor's level is fixed and reads an instrument height on the surveyor's rod at a benchmark. Each time that the tripod is taken down and set up, a new instrument height is read at the benchmark since it is impossible to set the tripod up at the same exact location and elevation. When surveying is begun again, a new set of calculations must then be started with a new instrument height. The prior calculations of the surveyor at the job are lost.

In completing even a small job, a surveyor may make from thirty to several hundred readings. When the surveying instrument is set up, the surveyor first turns to the benchmark and reads the surveyor's rod to get the height of the surveying instrument. He then turns to the job site and makes the numerous readings which are required for the job. These readings are all based on the instrument height as previously determined from the exact location at which the tripod is set. During the day or week while the surveyor is on the job it becomes necessary for the tripod including level to be moved and set back up frequently. Each time that the surveyor's level is set back up there is a new instrument height since the tripod cannot be set back up in the same exact location. This means that the surveyor must start a new set of calculations for the numerous readings he must make on the site based on the new instrument height. All of the previous grade readings and calculations read by the surveyor before he moved the surveying level are lost. He must now start a new set of calculations and grade readings depending on the new instrument height of the survey level. It is typical for an engineer to have several pages of grade readings at the end of each day's work which are lost when he begins the next day's work and the instrument is set back up. All of this can become very time consuming and tedious work, often frustrating the surveyor if the tripod has to be moved frequently.

Even minor situations such as taking a lunch break or moving the surveyor's level to allow a truck to pass by require that a new instrument height and new calculations be made.

Accordingly, an object of the invention is to provide a surveyor's level and method by which grade readings and calculations on a job are not lost when the tripod is moved to a new location and elevation.

Another object of the invention is to provide a surveyor's level which may set at the same instrument height each time the tripod is moved.

Still another object of the invention is to provide a surveyor's level which is elevatable and adjustable on a tripod so that it may be set in reference to a benchmark at a desired instrument height and reset to that same exact instrument height even after the level has been taken down and set back up at different locations and elevations at the job site.

Still another object of the invention is to provide a surveyor's level which may be adjusted in its vertical position to follow successive courses of brick or other building block material to determine if the mortar joint between the courses is level. Often the mortar joint becomes off-grade so that the walls become unlevel and the bricks at the various intersecting walls do not match up with each other.

SUMMARY OF THE INVENTION

The above objectives are accomplished according to the present invention by providing a surveyor's level and method by which the level is elevatable on the tripod so that it may be reset to a desired instrument height when set up at a new location. In this manner, as the tripod is repeatedly taken down and set back up, the level instrument may be adjusted to the previous instrument height so that the previous set of grade readings and calculations may not be lost eliminating the need to start a new set of readings. In a preferred embodiment, the apparatus of the invention includes an elevatable support for the surveyor's level which includes an adaptor device having an adaptor base cap which threads upon a collar of the tripod. The threaded base cap carries an elongated vertical sleeve which receives an elongated shaft in a slideable manner. Attached to the slideable shaft is a threaded adaptor collar like the threaded collar on the tripod. The level base cap may then be secured onto the adaptor collar. The vertical position of the elevatable base may be adjusted to a desired elevation so that the surveyor's level mounted thereon may be set at a desired instrument height. For example, a set screw may be provided in the sleeve of the adaptor cap and a groove may be provided in the shaft of the adaptor collar. The set screw extends into the groove and fixes the vertical position of the adaptor sleeve. Rotation must be prevented between the adaptor shaft and adaptor sleeve so that the level does not become off level by rotation. Another embodiment of the invention is provided whereby the vertical position of the adaptor sleeve may be set in positive increments by means of a rack gear and worm gear drive.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 10 is a view illustrating the application of an adjustable surveyor's level and method according to the invention; and FIG. 10a is a plan map illustrating the application of the present invention and method.

DESCRIPTION OF A PREFERRED EMBODIMENT

The invention relates to the art of surveying and in particular to a surveyor's level instrument which is adjustable in a vertical direction so that the instrument height may be reset at the same height when the tripod is taken down and set back up. The invention also contemplates the adapting of a conventional surveyor's level to incorporate the invention.

Figure 1:
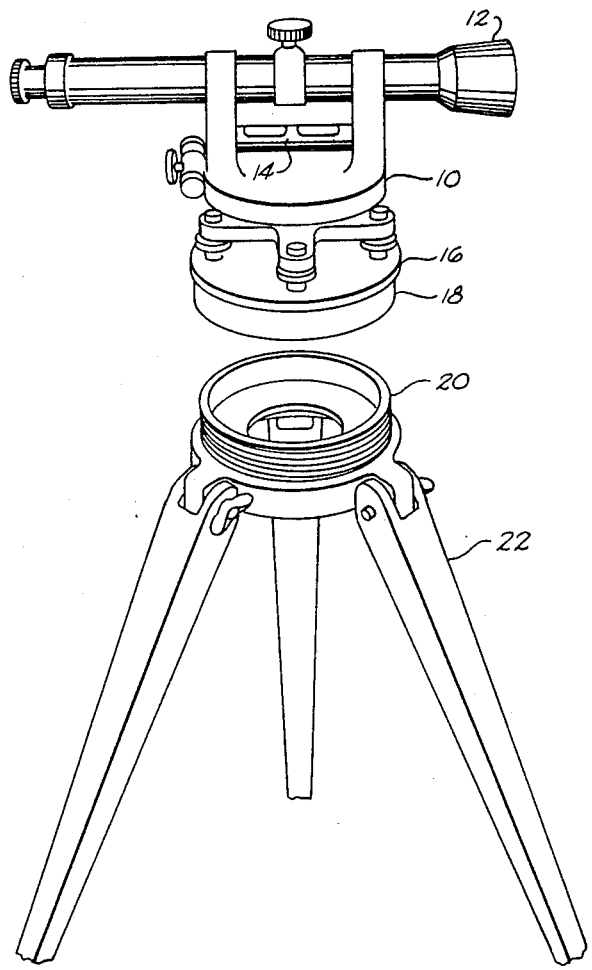
FIG. 1 is a view illustrating a prior art surveyor's level.

FIG. 1 illustrates the prior art which typically includes a level 10 which includes a telescope instrument 12 and a spirit level 14 carried on a level face 16. A threaded level base cap 18 includes interior threads which mate with threads on a tripod collar 20. Tripod further consists of tripod legs 22 provided in a conventional manner. The level 10 is taken off the tripod during non-use.

Referring now in more detail to the drawings, an explanation of the invention will be had. As can best be seen in FIG. 2, means for adapting a surveying instrument so that it may be reset at the same instrument height each time it moved at a job is illustrated which includes an adaptor device designated generally as 24. Adapter device 24 includes a first adaptor member in the form of a threaded adaptor collar 26 having an integral collar shaft 28 affixed thereto in central alignment. There is a second adaptor member in the form of an adaptor base cap 30 having an elongated base sleeve 32 centrally affixed thereto which opens at 34 and the top of adaptor cap 30. The elongated collar shaft 28 is slideably received in the sleeve 32. In accordance with the method of adapting a conventional surveyor's level according to the invention, adaptor base cap 30 is threaded onto the tripod collar 20 in much the same manner as the level base cap 18 of level 10. The level 10 is then mounted directly onto adaptor collar 26 by means of threaded level cap 18.

Figure 2:
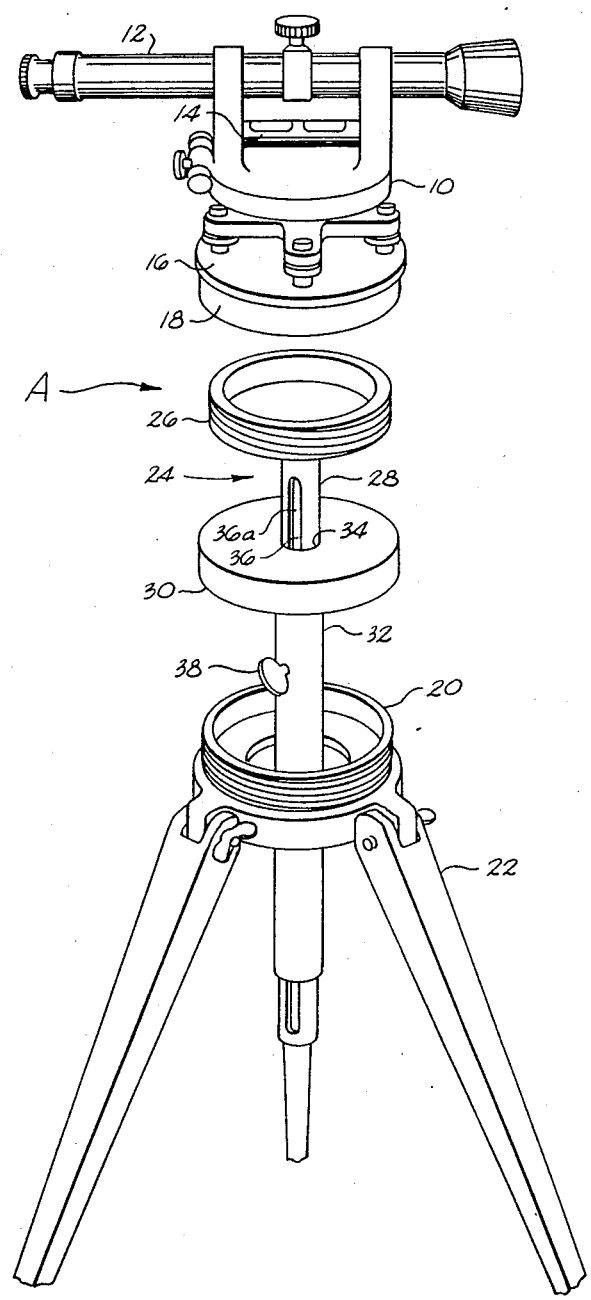
FIG. 2 is a view illustrating a surveyor's level and method in accordance with the present invention with parts removed.

Elevation adjustment means is provided for adjustment of the vertical position of level 10. In the case of FIG. 2, the elevation adjustment means includes a groove 36 having a flattened surface 36a to more aptly be engaged by a set screw 38. Set screw 38 is threadably encased in adaptor sleeve 32. Adapter shaft 28 may then slide in adaptor sleeve 32 and set in a desired vertical position by means of a set screw 38.

Anti-rotation means is provided by set screw 38 received in groove 36 so that base 16 of level 10 may not turn while telescope instrument 12 may turn freely. This maintains the level of the instrument as initially determined by spirit level 14, the advantages of which will become more apparent hereinafter.

Figures 3, 4:
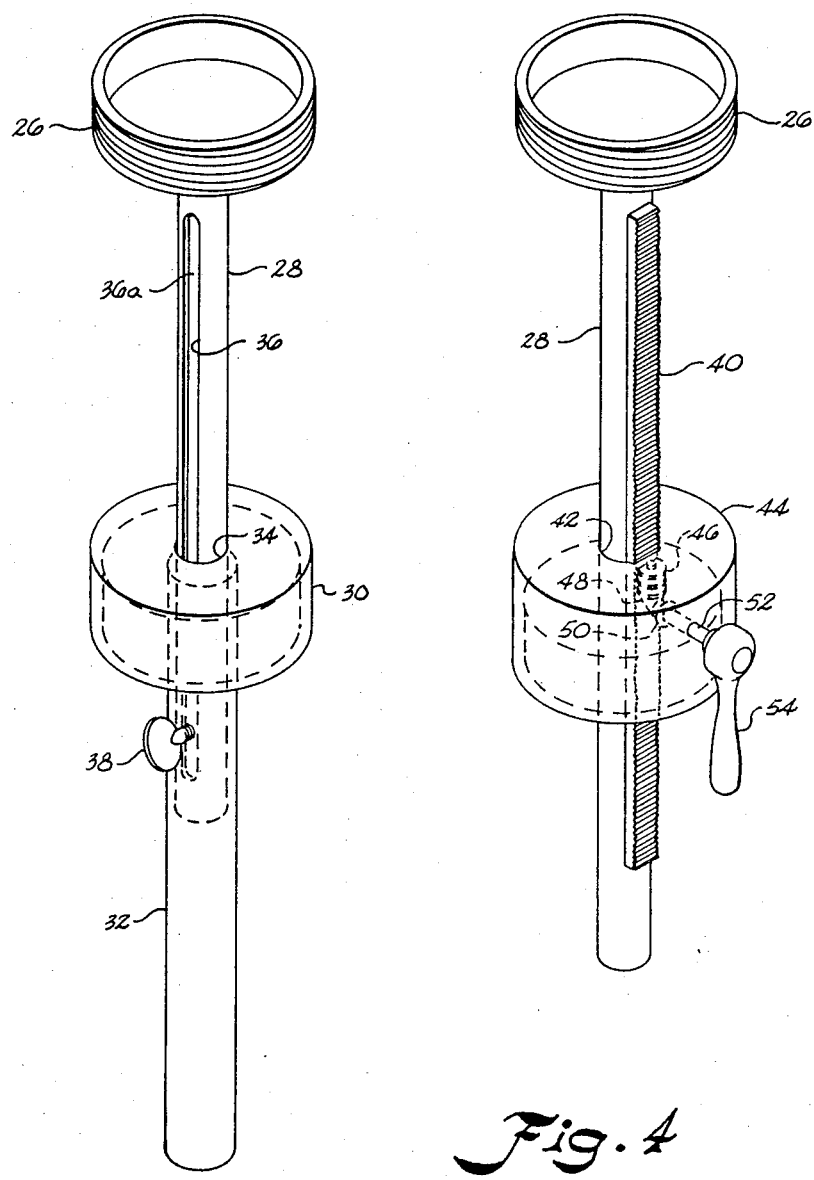
FIG. 3 is a perspective view of an adaptor advice for adapting a standard surveyor's level to an elevatable level in accordance with the apparatus and method of the present invention.
FIG. 4 is a perspective view of an alternate embodiment of an adaptor device for adapting a standard surveyor's level to an elevatable surveyor's level in accordance with the invention.

FIG. 4 illustrates another embodiment of adjustment means according to the invention wherein means for adjusting the height of the instrument in position increments is provided by a rack gear 40 affixed to adaptor shaft 28. A hole 42 formed in adaptor cap 44 is so shaped to accept the gear rack 40. A worm gear 46 meshes with the rack gear 40. A small beveled gear 48 on the end of worm gear 46 meshes with a drive worm gear 50 carried on the end of a drive shaft 52 which may be manually rotated by a handle 54. In this manner the adjustable vertical position of adaptor collar 26 may be positively set in an incremental manner which may be more convenient in many applications. In this embodiment, an adaptor sleeve 28 carried by adaptor cap 44 will be shaped corresponding to hole 42 to accept the adaptor sleeve 28 and rack gear 40.

Figures 5, 6:
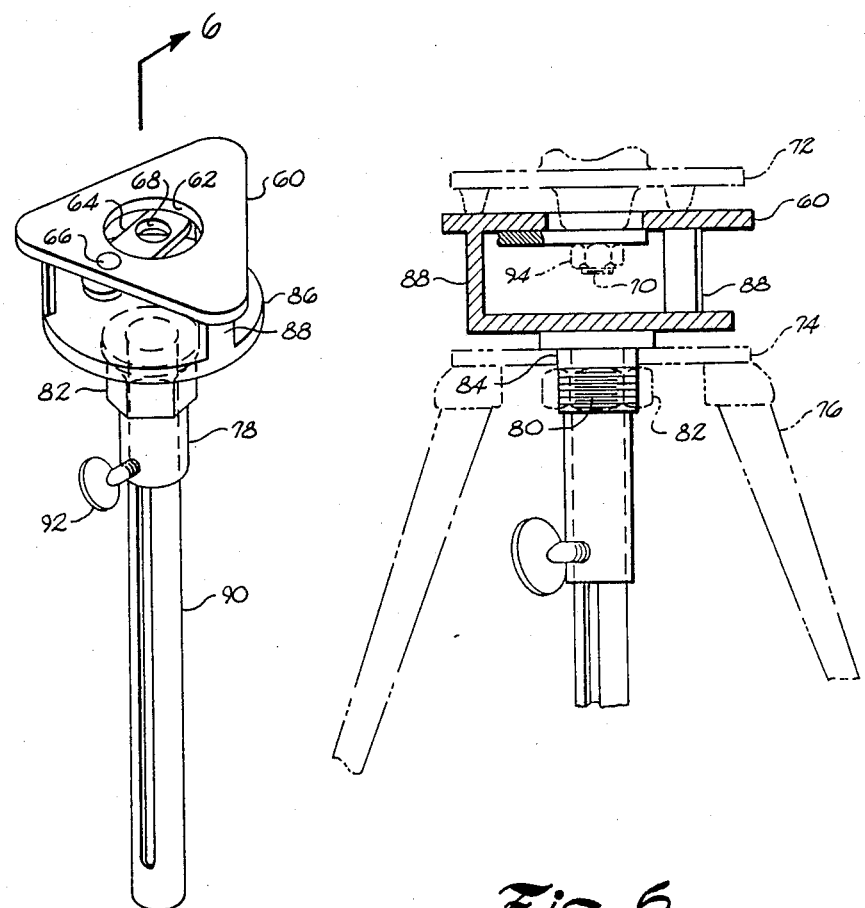
FIG. 5 is an alternate embodiment of an adaptor device for adapting a surveyor's level in a manner that the level is adjustably elevated in accordance with the invention.
FIG. 6 is a view illustrating the adaptor device of FIG. 5 employed with a different tripod mount.

As can best be seen in FIGS. 5 and 6, another embodiment of the invention is illustrated for application with a different type of surveyor's level and tripod mount. In this case, the adaptor device includes a triangular plate 60 having a central aperature 62. A pivot plate 64 is carried at a pivot 66 below aperature 62. In pivot plate 64 is an opening 68 for receiving a threaded post 70 forming part of surveyor's instrument 72 which serves as a means for mounting the surveyor's instrument to the pivot plate 64. The adaptor device further includes a short adaptor sleeve 78 which has an upper treaded portion 80 about which a lock nut 82 is threaded. Sleeve 78 is inserted through an opening 84 in tripod plate 74 and locked by means of lock nut 82 tightly threaded against the bottom of the plate as can best be seen in FIG. 6.

Sleeve 78 is affixed to a face plate 86 which supports triangular plate 60 in an intergal manner by means of three posts 88. There is an adaptor shaft 90 which slides in adaptor sleeve 78 and may be adjusted in its vertical position by means of a set screw 92, much as in the case of the adaptor device illustrated in FIG. 3. By inserting threaded post 70 of surveyor's level 72 in the opening 68 of pivoting plate 64, the surveyor's level may be moved around on base plate 60 until its desired disposition is had. Thereafter, lock nut 94 may be tightened to lock surveyor's level 72 in place.

Figure 7:
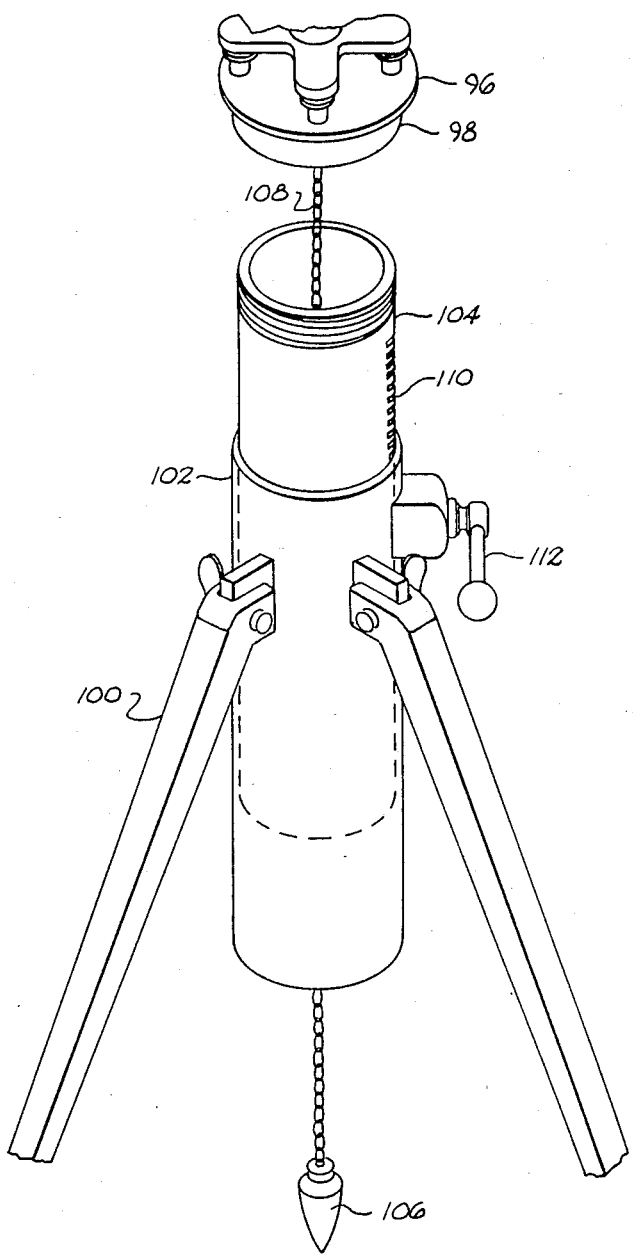
FIG. 7 is a view illustrating an adaptor device for adapting a survey transit to provide an adjustably elevated instrument in accordance with the invention.

Referring now to FIG. 7, an embodiment of the invention is illustrated for use with a surveyor's transit. A surveyor's transit is illustrated at 96 having a threaded transit cap 98. In accordance with the invention, there is a tripod 100 having a sleeve 102 which is hollow. A slideable shaft in this case is provided by a second hollow sleeve 104 slightly smaller and slideably received in sleeve 102. In the case of a transit, there is a plumb bob 106 depending downwardly from the transit by means of a chain 108. The construction of the invention illustrated as FIG. 7 is advantageous in accommodating plumb bob 106.

Elevation adjustment means is provided in case of FIG. 7 by a rack of gear grooves 110 which mesh with a worm gear manually rotated by handle 112 much in the same manner as that illustrated in FIG. 4. In this case the worm gear meshes with the gear grooves 110.

While the foregoing description has been in reference to an adaptor device for adapting a standard or conventional surveyor's level, it is to be understood of course, that the expedient of a constant height surveyor's level and construction therefor may be readily had in a surveyor's level from an original construction in addition to being able to adapt a conventional surveyor's level.

Figure 8:
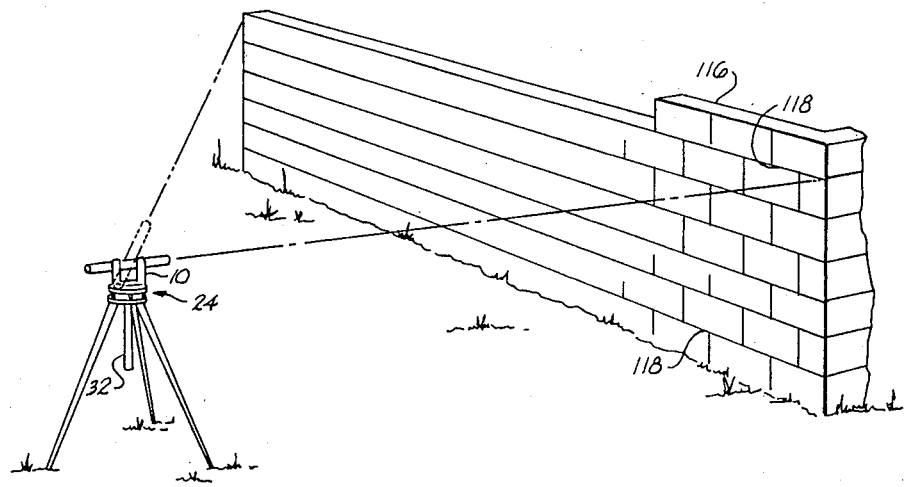
FIGS. 8 and 9 are perspective views illustrating the apparatus and method of the present invention for determining whether mortar joints are level and corner of buildings square.
Figure 9:
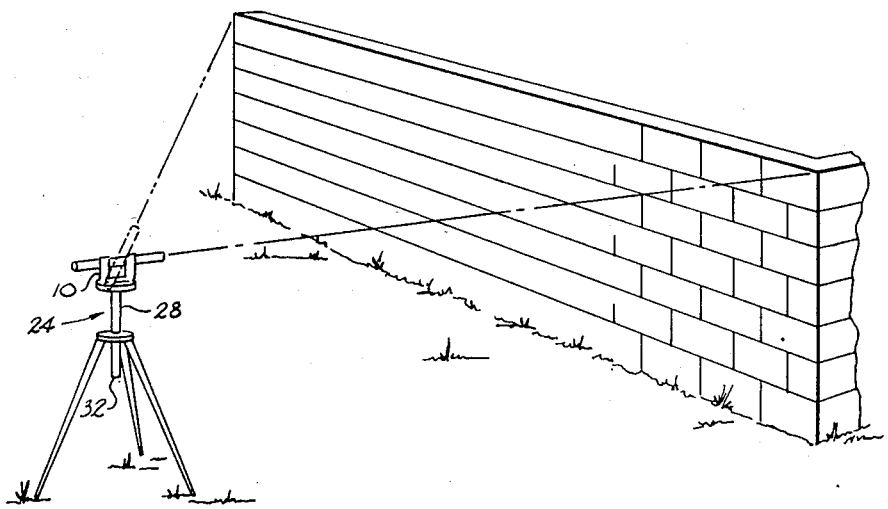

Referring now to FIGS. 8 and 9, the operation of a surveyor's level constructed or adapted in accordance with the invention will now be described in reference to laying brick or block in wall structures. In FIG. 8, a top course of brick 116 is illustrated with the formation of the course being form the right corner of the wall to the left corner. A surveyor's level 10 incorporating an elevation adjustable means is provided. The telescope instrument is set at a height that corresponds to a mortar line 118 at the right hand corner of the wall being formed. The mortar joint can be followed as bricks are laid to determine whether the joint is level. If each mortar line 118 beginning at the bottom is level, then the wall will be square and the corners of the walls will match. However, as often happens, if the mortar line begins to fall or rise relative to the grade level, this deviation can be detected by the surveyor's level and corrected. To survey the next mortar joint, the elevation of the level 10 is raised so that the height of the telescope instrument is next set on the top of the previously formed course of bricks. The instrument height being raised at least 2¼ inches, the height of convention bricks, for each course of bricks surveyed. In this manner, the grade level of the mortar joint may be read continuously across each course of bricks to ensure that the bricks are laid in a level manner and match the bricks of the intersecting wall at the corner.

In the case of normal surveying operation, the operation of the invention will now be explained in reference to a simple survey job illustrated in FIG. 10 and FIG. 10a. FIG. 10a represents a map of the topography being surveyed in FIG. 10. There is a floor 120 which has been laid in the form of a slab on a previously graded ground surface. There is a bench mark 113 which is 210'.00". The surveyor's rod B is set up on the bench mark and the instrument height of telescope 12 is set at any desired reading on surveyor's rod B. It may be desirable to set the instrument height at benchmark 210'.00". The operation of the device will be described with the bench mark set at 210'.00". With the height of telescope 12 set on the bench mark, the telescope is turned around to surveyor's rod B on slab 120. If slab 120 is on grade (205'.00"), the surveyor should get a grade reading of five feet on the surveyor's rod B. A typical surveyor's rod is twelve feet having markings in feet, tenths of feet, and hundredths of feet. By having the instrument height of the surveyor's level set at the bench mark, the surveyor may get the grade readings directly as they are on the map in FIG. 10. For example, there is a sewer line 122 which has a pipe opening at a grade reading of 200'.00" which has a slope down to the grade reading of 198'.00". The surveyor may turn quickly to a surveyor's rod at the sewer pipe openings and check for grade by getting a grade reading of ten feet on the surveyor's rod. Next, the fall of sewer line 122 may be checked by reading surveyor's rod to get a twelve feet grade reading corresponding to the grade of 198'.00".

This is a very simplified illustration of the advantages of the invention. Typically, a surveying job at a building site will require several hundred readings rather than the several readings illustrated. Each reading may be read several times during the day as work and changes are made at each reading site. In the case of a conventional surveyor's instrument, the instrument is first set up and an instrument height is read at surveyor's rod B. However, as the elevation of the surveyor's level is not adjustable. The instrument height would typically include tenths and hundredths of a foot. For example, in the case of FIG. 10, the instrument height may read 212'.52". This means that the instrument height is 2.52 feet above the bench mark. Once the instrument height is determined, the surveyor then engages in a number of calculations and grade readings based on this instrument height which the surveyor has no control over. When the surveyor has to move the surveyor's level and tripod, a new instrument height is read and a whole new set of calculations and grades must be started. This means that the surveyor has lost all of his prior calculations and grade readings for the sites previously read. He must start new calculations based on the new instrument height. In one day, a surveyor can have many, many pages of calculations which are lost. In accordance with the present invention, no calculations are lost and the surveyor may start at the same instrument height each day and time that the tripod is set up by adjusting the vertical position of the surveyor's instrument 10.

In accordance with the invention, a highly advantageous method of surveying may be had using a surveying instrument mounted on a tripod in which the instrument may be reset to a prescribed height in reference to a prescribed benchmark upon relocation of the tripod to different locations and elevations at a job site. The method includes mounting the surveying instrument on the tripod in a manner that the instrument may be adjusted in its vertical position relative to the tripod. The tripod is set up at a first location and the surveying instrument is adjusted vertically on the tripod so that the instrument is set at a prescribed instrument height. Grade readings may then be taken at a job site. The tripod may be moved at a job site as needed over the duration of surveying operations at the job site. The instrument may be readjusted on the tripod vertically to the prescribed instrument height as needed each time the tripod is moved so that surveying calculations at the job site may be based on a constant instrument height during repeated moving of the tripod. The previous set of calculations and grade readings based on the same instrument height may be used.

In an advantageous form of the invention, a method of surveying with a surveying instrument mounted on a tripod is provided in which surveying calculations may be based on a constant instrument height despite moving of the tripod. The method includes adapting the tripod to support the surveying instrument in a elevatable manner. Means are provided for adjusting and fixing the elevated position of the surveying instrument to the tripod so that the height of the instrument may be set at a prescribred instrument height relative to a prescribed benchmark at the job site. Each time the tripod is moved to a new location at the job site, the instrument may be adjusted to the same instrument height.

In accordance with the invention, it is highly advantageous that the surveying instrument can be set at a selected instrument height. Thereafter, on each reading, the rod man, by knowing the constant instrument height, can tell the surveyor what grade to read through the instrument. Little or no calculations are necessary as in the case of conventional surveying instruments and techniques.

While a preferred embodiment of the invention has been described using specific terms, such description is for illustrative purposes only, and it is to be understood that changes and variations may be made without departing from the spirit or scope of the following claims.

What is claimed is:

1. A method of constructing a surveyor's instrument mounted on a tripod for use in a surveying method wherein the instrument height determined by sighting through the surveyor's instrument to a prescribed benchmark may be reset at a constant height with respect to said benchmark with the tripod moved on a job site to different locations wherein the method comprises:
   providing an elevatable base carried by said tripod on which said surveying instrument is mounted;
   providing adjustment means for adjusting the vertical position of said elevatable base relative to said tripod in a manner that said elevatable base may be set to said instrument height upon repeated set-ups of said tripod whereby a constant instrument height can be used throughout the calculations of the surveyor at the job site;
   providing a first adaptor member in the form of an adaptor collar which threadably mates with a base cap of said surveying instrument, and said adaptor collar having an integral elongated shaft; and
   providing second adaptor member in the form of an adaptor base cap which threadably mates with a threaded collar of said tripod, and providing said adaptor base cap with an elongated sleeve which slideably receives said elongateg shaft of said adaptor collar.

2. The method of claim 1 wherein said collar shaft is hollow.

3. The method of claim 1 wherein said collar shaft and said base sleeve are provided in the form of circular cross sections.

4. The method of claim 1 further including preventing the rotation of said first adaptor member relative to said second adaptor member.

5. The method of claim 1 wherein the provision of said adjustment means includes providing for adjusting the vertical position of said elevatable base means in a positive incremental manner.

6. A method of surveying with a surveying instrument mounted on a tripod in which surveying calculations may be based on a constant instrument height despite moving of the tripod to different locations and elevations at a job site, said method comprising:
   adapting said tripod to support said surveying instrument in an elevatable manner to provide vertical adjustment of the instrument height over a range of 3 inches or more
   adjusting and fixing the elevated position of said surveying instrument to said tripod so that the height of said instrument may be set at a prescribed instrument height relative to a prescribed benchmark at said job site each time the tripod is moved to a new location at said job site.

7. The method of claim 6 including carrying out repeated surveying calculations at a number of different ones of said new locations at said job site using said prescribed instrument height regardless of changes in elevation of said locations.

8. A method of surveying using a surveying instrument mounted on a tripod in which the instrument may be reset to a prescribed height in reference to a prescribed benchmark upon relocation of said tripod to a different location having different elevations at a job site, said method includes mounting said surveying instrument on said tripod in a manner that said instrument may be adjusted in its vertical position relative to said tripod in a range of 3 inches or more, setting said tripod up at a first location and adjusting said surveying instrument vertically on said tripod so that said instrument is set at said prescribed instrument height, taking grade readings at a job site, moving said tripod at said job site as needed over the duration of surveying operations at said job site, and readjusting the said instrument on said tripod vertically to said prescribed instrument height as needed each time said tripod is moved so that surveying calculations at said job site may be based on a constant instrument height during repeated moving of said tripod and previous calculations are not lost.

9. A surveyor's level for use in surveying a job site of the type which includes a surveyor's instrument mounted on a tripod which may be leveled and utilized to read grades at the job site by reference to a benchmark wherein the improvement comprises:
   an elevatable base carried by said tripod in a manner that the vertical position of said elevatable base may be adjusted;
   elevation adjustment means for adjusting the vertical position of said elevatable base to a desired position to thereby set the height of the surveyor's instrument to a prescribed instrument height in reference to said benchmark;
   means for fixing said elevatable base and surveyor's instrument mounted thereon at said prescribed instrument height in a manner that said tripod may be moved to different locations at said job site and said surveyor's instrument may reset to said prescribed instrument height so that calculations may be retained and utilized continously during surveying operations until the job is completed;
   a first adaptor member for attachment to said surveyor's instrument and a second adaptor member carried by said tripod, said first adaptor member being carried by said second adaptor member for relative vertical movement;
   said first adaptor member includes an elongated shaft; and
   said second adaptor member includes an elongated sleeve which slideably receives and shaft of said first adaptor member.

10. The apparatus of claim 9 wherein said elevation adjustment means includes means for adjusting the vertical position of said elevatable base in accordance with predetermined positive increments of vertical position.

11. The apparatus of claim 9 wherein said elevation adjustment means includes means engaging said shaft of said first adaptor member and said slideably received shaft of said second adaptor member to adjust the relative positions of said hollow shaft and said second shaft.

12. The apparatus of claim 9 wherein said elongated shaft of said first adaptor member is hollow whereby a plumb line may be passed through said second shaft from a transit mountd to said first adaptor member.

13. The apparatus of claim 9 herein said elongated shaft of said first adaptor member and said sleeve of said second adaptor member have a circular cross section.

14. The apparatus of claim 9 including antirotation means preventing rotation of said first adaptor member relative to said second adaptor member.

15. The apparatus of claim 9 wherein said first adaptor member includes an adaptor collar which is threadably mated with a base cap of said surveyor's instrument;

an elongated collar shaft integral with said adaptor collar;

said second adaptor member including an adaptor base threadably mated with a collar of said tripod;

an elongated sleeve integral with said adaptor base; and said collar shaft being slideably received in said base sleeve.

16. The apparatus of claim 15 including antirotation means for preventing rotation of said adaptor collar relative to said adaptor base.

17. The apparatus of claim 15 wherein said elevation adjustment means includes means connected between said collar shaft and said base sleeve for positively moving said collar shaft vertically with respect to said base sleeve in predetermined positive increments whereby the vertical position of said surveyor's instrument may be set and controlled in a positive manner.

18. A surveying method for maintaining the level of block work in the construction of walls formed by horizontally stacked courses of block and the like with mortar therebetween wherein a surveyor's instrument mounted on a tripod is utilized, said method comprising the steps of providing an elevatable base on said tripod having a vertical adjustment in a page of 3 inches or more mounting said surveyor's instrument onto said elevatable base, siting through said instrument to check the level of a course of said blocks, adjusting said elevatable base vertically upwards for successive courses of blocks built upon one another to site on said successive courses of blocks to ensure said wall constructed from said blocks and mortar joints therebetween are in level.

* * * * *